No. 875,373. PATENTED DEC. 31, 1907.
G. A. PARMENTER.
CAR FENDER.
APPLICATION FILED JULY 20, 1907.

Attest:
Ewd L. Folson
Edward N. Sarton

Inventor,
George A. Parmenter,
By Spear Middleton, Donaldson & Spear
Attys.

UNITED STATES PATENT OFFICE.

GEORGE A. PARMENTER, OF CAMBRIDGE, MASSACHUSETTS.

CAR-FENDER.

No. 875,378.   Specification of Letters Patent.   Patented Dec. 31, 1907.

Application filed July 20, 1907. Serial No. 384,801.

*To all whom it may concern:*

Be it known that I, GEORGE A. PARMENTER, a citizen of the United States, residing at Cambridge, Massachusetts, have invented certain new and useful Improvements in Car-Fenders, of which the following is a specification.

My invention relates to improvements in fenders or guards for railway cars of the type known as trip and drop scoop, and is particularly designed for cars having a double swiveled truck at each end. In fenders or guards for use on this type of car it is desirable to carry the scoop on or supported from the truck frame and the trip frame on the front end of the car body. As the position of the truck changes with relation to the car body in rounding curves, it is necessary to provide compensating or equalizing devices between the trip and the scoop. A fender or guard having such means for maintaining the proper relation between the parts is claimed broadly in a patent granted to me on the 25th day of April, 1899, #623818, and the present invention is designed as an improvement upon this, having as its object to simplify the construction, to make it more flexible and less liable to be damaged or loosened from its fastenings by the vibrations of the truck and thereby increase the durability. I have also aimed to provide a trip which without disconnecting any parts can be temporarily readily raised out of working position when desired as in case of heavy snow.

With these and other objects in view the invention comprises the features of construction and arrangement and combination of parts hereinafter described and fully set forth in the appended claims.

The invention is illustrated in the accompanying drawing in which:—

Figure 1:
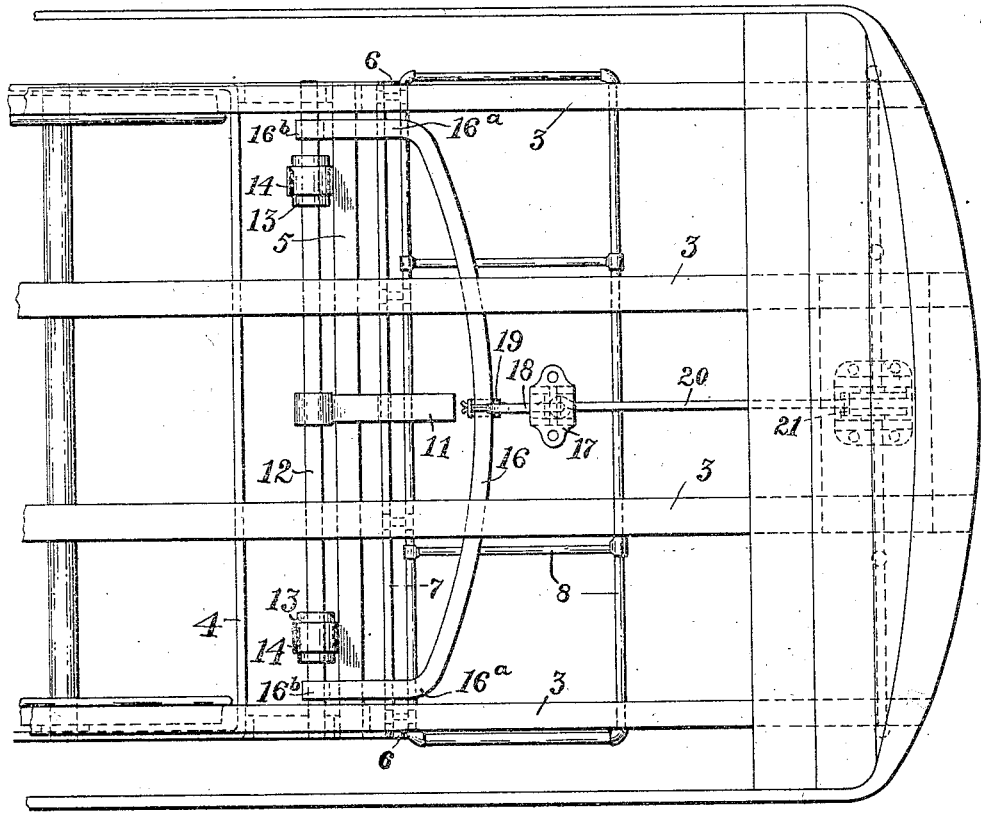
Figure 2:
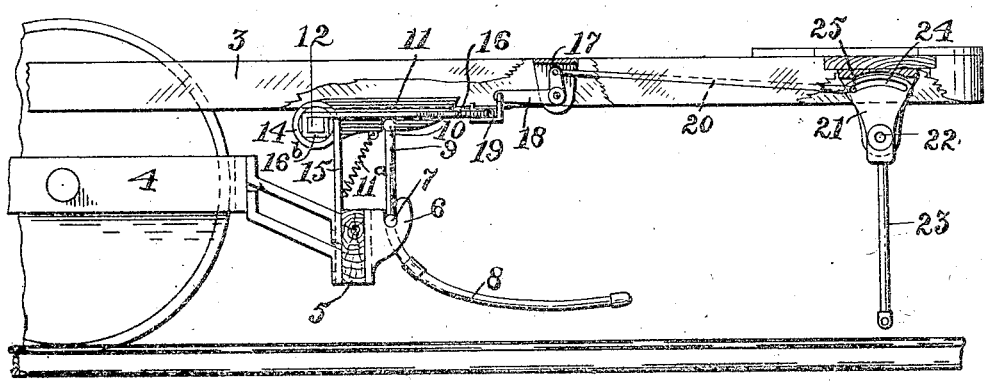

Figure 1 is a partial plan view showing a sufficient portion of a car to illustrate the application of the invention. Fig. 2 is a similar view in sectional elevation.

Referring by reference characters to this drawing, the numerals 3 designate the sills of the car body and 4 the truck frame.

5 is the usual front cross bar which carries brackets 6 having recesses in their upper sides in which the top horizontal rod 7 of the scoop 8 is pivotally seated. The scoop is normally held elevated in the position shown in Fig. 2 by an upwardly extending arm 9 which has its upper end or head 10 seated in a recess in a locking arm or pawl 11 rigidly secured upon a transverse rocking bar 12. Thus normally the locking device 11 engaging the upper end of the arm 9 will hold the scoop elevated, but if the arm 11 be raised to free the end 10 from the notch, the scoop will instantly drop by gravity. The bar 12 is preferably of square or other non-circular cross section and passes through sleeves or bushings 13 which are journaled in bearings 14 carried at the upper ends of spring arms 15 which are carried by the truck frame, a convenient manner of connection being to bolt them to the rear side of the cross bar 5. A bar 16 extends across from side to side of the car and throughout the greater portion of its length is curved on the arc of a circle which has as its center the pivotal axis of the truck frame 4. The bar has rearwardly extending ends or arms 16$^a$ which are provided with non-circular sockets 16$^b$, through which the ends of the non-circular bar pass. It will thus be seen that if the curved part of the bar 16 be raised, the rod or bar 12 will be rocked and the locking device 11 raised and disengaged from the upper end of the arm 9 of the fender. The locking device 11 is normally held down in engaging or locking position by a spring 11$^a$.

At a convenient point in proximity to the curved bar 16, I locate a depending forked bracket 17, which may be secured to the floor of the car and in which is pivoted a bell crank lever 18 which has one arm extending rearwardly and connected to a loop or guide 19, which embraces the curved bar 16. The other arm of the bell crank lever is connected by a rod 20 with an arm 21 carried by the upper bar or rock shaft 22 of the trip frame 23, which is pivotally suspended from the front of the car body. The frame 21 is preferably provided with a slot 24, which is engaged by a transverse projection or pin 25 on the rod 20. By this arrangement it will be seen that with the trip frame 23 in the position shown in Fig. 1, should an obstruction be encountered the trip arm will be swung rearwardly, thus carrying the arm 21 forwardly and as the pin 25 normally rests in the rear end of the slot a pull will be exerted upon the rod 20. This will rock the bell crank lever 18, and through the connecting loop 19 will raise the bar 16 and drop the scoop in the manner hereinbefore described. Owing however, to the fact that the bar 16 is curved concentric to the axis of the truck no matter how much the car body swings with relation to the truck in rounding curves, the same operative relation will always be maintained between the parts. It will also be readily seen that by the manner of mounting a certain degree of flexibility or elasticity is secured and thus the parts are not subjected to violent shocks where more of the parts are rigidly mounted upon the truck frame.

It may sometimes be found desirable or necessary to raise the trip frame temporarily away from proximity to the track, as for instance, in cases of heavy snow. By the construction hereinbefore described, I am enabled to accomplish this by simply swinging the trip frame forward, the slot in its upwardly extending arm permitting this without requiring any disengagement of the operating connections. The trip frame may be suspended for the desired time in its raised position and again dropped into a vertical position ready to operate the scoop in the manner hereinbefore described, the pin traveling in the slot.

Having thus described my invention, what I claim is:—

1. The combination with a car body and its swiveled truck frame, of a scoop pivotally carried by the truck frame, a locking device having a resilient connection with the truck frame and engaging the scoop, a trip frame pivotally carried by the car body, and means interposed between the trip frame and said locking device whereby the movement of the trip frame operates the locking device to release the scoop, substantially as described.

2. The combination with a car body and swiveled truck frame, of a scoop pivotally carried by the truck frame, a rock shaft yieldingly supported by the truck frame, a locking device carried by the rock shaft for holding the scoop normally elevated, a trip device carried by the car body and automatically adjusting operating connections interposed between the trip frame and rock shaft for operating the latter, substantially as described.

3. The combination with a car body and swiveled truck frame, of a scoop pivotally carried by the truck frame, and having an upwardly extending portion, uprights carried by the truck frame, a rock shaft journaled in said uprights having a locking device for engaging the upwardly extending part of the scoop, a curved bar connected to the rock shaft, a trip frame pivoted to the car body and means whereby the rocking of the trip frame releases the curved bar, substantially as described.

4. The combination with a car body and truck frame, of a scoop pivotally supported from the truck frame, and having an upwardly extending part, vertical yieldable standards carried by the truck frame, a rock shaft journaled in said standards, a trip device supported from the front of the car body and means whereby the movement of the trip frame operates said rock shaft, substantially as described.

5. In a car fender, a pivoted scoop, a locking device tending to hold the same normally elevated, a pivoted trip carried at the front of the car body, and operating means interposed between the trip and said locking device whereby the rearward movement of the trip releases the locking device, said connections including an arm extending upwardly above the pivoted point of the trip and having an elongated slot or guide, and a pull rod having a part or projection normally resting in the rear end of said slot, substantially as described.

In testimony whereof, I affix my signature in presence of two witnesses.

GEORGE A. PARMENTER.

Witnesses:
 HARRY L. NEVONS,
 ROSE HAYDEN.